(12) United States Patent
Honda

(10) Patent No.: US 11,293,696 B2
(45) Date of Patent: Apr. 5, 2022

(54) THERMAL SPRAY MATERIAL

(71) Applicant: KROSAKIHARIMA CORPORATION, Fukuoka (JP)

(72) Inventor: Kazuhiro Honda, Fukuoka (JP)

(73) Assignee: KROSAKIHARIMA CORPORATION, Fukuoka (JP)

(*) Notice: Subject to any disclaimer, the term of this patent is extended or adjusted under 35 U.S.C. 154(b) by 693 days.

(21) Appl. No.: 15/500,417

(22) PCT Filed: Jun. 30, 2015

(86) PCT No.: PCT/JP2015/068842
§ 371 (c)(1),
(2) Date: Jan. 30, 2017

(87) PCT Pub. No.: WO2016/021337
PCT Pub. Date: Feb. 11, 2016

(65) Prior Publication Data
US 2017/0211885 A1 Jul. 27, 2017

(30) Foreign Application Priority Data
Aug. 8, 2014 (JP) .............................. JP2014-162650

(51) Int. Cl.
*F27D 1/16* (2006.01)
*C23C 4/10* (2016.01)
*C22C 1/05* (2006.01)
*C04B 35/66* (2006.01)

(52) U.S. Cl.
CPC ................ *F27D 1/16* (2013.01); *C04B 35/66* (2013.01); *C22C 1/05* (2013.01); *C23C 4/10* (2013.01); *F27D 1/1636* (2013.01)

(58) Field of Classification Search
CPC .................................. F27D 1/16; C04B 35/66
See application file for complete search history.

(56) References Cited

U.S. PATENT DOCUMENTS

| | | | | | |
|---|---|---|---|---|---|
| 4,486,545 | A | * | 12/1984 | Sugimoto | C04B 35/14 501/123 |
| 6,080,360 | A | * | 6/2000 | Pfeffinger | C23C 4/04 420/534 |
| 6,361,877 | B1 | * | 3/2002 | Miyai | C22C 21/02 427/452 |
| 2012/0032218 | A1 | * | 2/2012 | Choi | H01L 33/0075 257/98 |
| 2013/0295375 | A1 | * | 11/2013 | Ernst | C23C 4/06 428/332 |
| 2014/0234634 | A1 | * | 8/2014 | Mizuno | C23C 4/04 428/446 |
| 2014/0234653 | A1 | * | 8/2014 | Mizuno | C23C 4/10 428/649 |
| 2016/0002764 | A1 | * | 1/2016 | Gries | B22F 1/0088 423/409 |
| 2016/0326057 | A1 | * | 11/2016 | Honda | C01B 33/02 |
| 2017/0021328 | A1 | * | 1/2017 | Darvas | B01J 19/26 |
| 2017/0211885 | A1 | * | 7/2017 | Honda | C23C 4/10 |
| 2017/0306213 | A1 | * | 10/2017 | Morgan | C04B 28/06 |
| 2017/0314613 | A1 | * | 11/2017 | Yasuo | C23C 4/06 |
| 2018/0347024 | A1 | * | 12/2018 | Nishio | C23C 4/10 |

FOREIGN PATENT DOCUMENTS

| | | | |
|---|---|---|---|
| JP | 2006098029 A | * | 4/2006 |
| JP | 2006098029 A | | 4/2006 |
| JP | 2006151771 A | | 6/2006 |

(Continued)

OTHER PUBLICATIONS

HC Stark product catalog (Year: 2014).*

(Continued)

*Primary Examiner* — Nicholas R Krasnow
(74) *Attorney, Agent, or Firm* — Paul D. Bianco; Gary S. Winer; Fleit Intellectual Property Law

(57) ABSTRACT

Provided is a thermal spray material capable of, when used in a thermal spray operation for repairing a furnace wall of an industrial furnace or for other purposes, maintaining good post-repetition bondability with respect to a target surface to thereby prevent peel-off of a resulting thermally sprayed deposit, and improving initial ignitability while suppressing dust-generating property. The thermal spray material comprised a basic compound comprising at least one of a Ca component and an Mg component, a metal Si powder, and a silica-based or alumina-silica based powder. A content rate of a fraction constituting the basic compound and having a particle size of 0.15 mm or less is 30 mass % or more with respect to 100 mass % of the basic compound, and a content rate of a fraction constituting the metal Si powder and having a particle size of 20 μm or less is from 10 mass % to 25 mass % with respect to 100 mass % of the thermal spray material. Further, (the content rate (mass %) of the fraction constituting the metal Si powder and having a particle size of 20 μm or less, with respect to 100 mass % of the thermal spray material)/(a content rate (mass %) of the fraction constituting the basic compound and having a particle size of 0.15 mm or less, with respect to 100 mass % of the thermal spray material) is from 0.8 to 10, and a content rate of a fraction constituting the metal Si powder and having a particle size of 10 μm or less is 60 mass % or more with respect to 100 mass % of the metal Si powder.

2 Claims, No Drawings

(56) References Cited

FOREIGN PATENT DOCUMENTS

JP          2012188345  A   *  10/2012
JP          2012188345  A      10/2012

OTHER PUBLICATIONS

Hogonas—https://www.hoganas.com/globalassets/download-media/stc/PD-4074.pdf (Year: 2017).*
Translation of Table 1 row labels in JP2012188345A (Year: 2012).*
International Search Report dated Aug. 17, 2015 for PCT/JP2015/068842 filed Jun. 30, 2015.
Written Opinion dated Feb. 11, 2016 for PCT/JP2015/068842 filed Jun. 30, 2015.
International Preliminary Report on Patentability dated Feb. 14, 2017 for PCT/JP2015/068842 filed Jun. 30, 2015.
Written Opinion for PCT/JP2015/068842 filed Jun. 30, 2015.

* cited by examiner

THERMAL SPRAY MATERIAL

TECHNICAL FIELD

The present invention relates to a thermal spray material for use in repair of a furnace wall of an industrial furnace or for other purposes, and more specifically to a thermal spray material for use with a thermal spray process utilizing heat generated based on combustion of a metal powder.

BACKGROUND ART

Examples of a technique for repairing a furnace wall of an industrial furnace include a thermal spray process configured to thermally spray a refractory raw material powder to a repair target region of the furnace wall. As the thermal spray process, there have been known flame spraying, plasma spraying and laser spraying. However, all of these thermal spray processes require a large-scale apparatus, thereby involving high facility cost and operational complication.

As another example, there has been known a process which comprises: preparing a thermal spray material comprising, as main components, a refractory raw material powder and a metal powder; spraying the thermal spray material to a target surface using a carrier gas consisting of oxygen, and melt-adhering the refractory raw material powder to the target surface by means of heat generated based on combustion of the metal powder. In this thermal spray process, an apparatus used therefor is relatively simple in structure, and operationally easy. In addition, it is suitable for repair of a furnace wall because a larger volume of deposit can be thermally sprayed, as compared to plasma spraying and laser spraying.

As a thermal spray material usable for the thermal spray process utilizing heat generated based on combustion of a metal powder, there has been known a thermal spray material comprising a magnesia-based powder, a metal Si powder and a silica-based powder (see, for example, the following Patent Document 1). There has also been known a thermal spray material comprising a calcia-based powder, a metal Si powder and a silica-based powder (see, for example, the following Patent Document 2). Further, there has been known a thermal spray material comprising an ignition promoter and a combustion aid, for ensuring ignitability and combustion sustainability (stability) (see, for example, the following Patent Document 3).

CITATION LIST

Parent Document

Patent Document 1: JP 2006-098029A
Patent Document 2: JP 2006-151771A
Patent Document 3: JP 2012-188345A

SUMMARY OF INVENTION

Technical Problem

For example, as described in the Patent Document 1, in the thermal spray material comprising a magnesia-based powder, a metal Si powder and a silica-based powder, the metal Si power is formed as a $SiO_2$ component through a reaction with oxygen as a carrier gas, and then the $SiO_2$ component reacts with the magnesia-based powder ($MgO + SiO2 \rightarrow MgO \cdot SiO_2$) to generate heat, so that melting of the silica-based powder is promoted, thereby improving adherability and bondability. In this case, the reaction process in which the metal Si powder is formed as $SiO_2$ through a reaction with oxygen involves combustion-based heat generation. From this point of view, it is conceivable to add the metal Si powder in a large amount to thereby increase an amount of generated heat, thereby improving adherability and bondability of a thermally sprayed deposit. However, in the thermal spray process utilizing heat generated based on combustion of a metal Si powder, an amount of oxygen is restricted from a viewpoint of a methodological principle thereof. That is, in this thermal spray process, an exothermic reaction occurs after the thermal spray material is sprayed and the refractory raw material powder and the metal Si powder are brought into collision with a target surface. Thus, increasing an amount of oxygen to increase a flow speed of a carrier gas consisting of oxygen leads, rather, to increases in cooling level of and in rebound amount of the refractory raw material powder and the metal Si powder. Thus, it becomes important how to efficiently induce the combustion reaction by adding the metal Si powder under a restricted amount of oxygen.

If the metal Si powder is added in a large amount, an amount of oxygen necessary for the combustion reaction becomes insufficient, so that an uncombusted part of the metal Si powder which does not contribute to any exothermic reaction will undesirably remain in a resulting thermally sprayed deposit. On the other hand, if the metal Si powder is added in an insufficient amount, it becomes unable to melt the silica-based powder and the magnesia-based powder as aggregate, resulting in deteriorated bondability of a resulting thermally sprayed deposit with respect to the target surface.

In this thermal spray process, after $SiO_2$ is formed through the combustion reaction between the metal Si powder and the oxygen, the $SiO_2$ reacts with MgO, as shown in the above formula. For efficiently inducing these reactions, it is necessary to reduce a particle size of each of the metal Si powder and the magnesia-based powder as raw materials for inducing the reactions, as pointed out by the Patent Document 1 (paragraphs [0024] and [0026]).

However, as a result of detailed studies conducted in regard to the above reaction by the inventors, it was found that the reactions cannot be sufficiently induced only by simply reducing a particle size of each of the metal Si powder and the magnesia-based powder. That is, even though each of the metal Si powder and the magnesia-based powder has a sufficiently small particle size, a problem arises when respective added amounts of the metal Si powder and the magnesia-based powder are badly balanced. For example, if the added amount of the magnesia-based powder is excessive large with respect to the added amount of the metal Si powder, an amount of $SiO_2$ formed through the combustion reaction becomes excessively small, so that an unreacted part of the magnesia-based powder will undesirably remain in a resulting thermally sprayed deposit. A problem also occurs when a particle size distribution of each of the metal Si powder and the magnesia-based powder to be added is improper. For example, in the case where, in the particle size distribution of the magnesia-based powder, a magnesia-based powder fraction having a relatively large particle size exhibits a relatively large value, and a magnesia-based powder fraction having a relatively small particle size exhibits a relatively small value, an unreacted part of the magnesia-based powder will undesirably remain in a resulting thermally sprayed deposit, because magnesia-based particles having the relatively large particle size are contained in a relatively large amount. These problems occur in not only the case where the magnesia-based powder is used as the refractory raw material powder as mentioned above, but also the case where a calcia-based powder is used as the refractory raw material powder, simply as a substitute for the magnesia-based powder, as in the Patent Document 2.

If the uncombusted metal Si powder or the unreacted magnesia-based powder (or unreacted calcia-based powder) remains in a thermally sprayed deposit, as mentioned above, peel-off of the thermally sprayed deposit becomes prominent. The reason is as follows.

An operation of an industrial furnace is performed repeatedly on a periodic basis, so that a furnace wall of the industrial furnace, particularly, a liner material of a furnace port, is exposed to an environment which is subjected to repetitive heating and cooling. If the uncombusted metal Si powder remains in the thermal sprayed deposit in such an environment, Si is oxidized due to the repetitive heating and cooling and formed as $SiO_2$, so that resulting volume expansion leads to crack formation in the thermally sprayed deposit. As a result, peel-off of the thermally sprayed deposit due to the crack becomes prominent. Similarly, if the magnesia-based powder (or calcia-based powder) remains in the thermal sprayed deposit in such an environment, the repetitive heating and cooling causes crack formation in the thermally sprayed deposit, because the magnesia-based powder (or calcia-based powder) exhibits relatively large thermal expansion. As a result, peel-off of the thermally sprayed deposit due to the crack becomes prominent. Therefore, even using one of the thermal spray materials described in the Patent Publications 1 and 2, if the uncombusted metal Si powder or the unreacted magnesia-based powder (or unreacted calcia-based powder) is contained in a resulting thermally sprayed deposit in a large amount, a problem arises that that peel-off of the thermally sprayed deposit becomes prominent after repetitive heating and cooling.

In the thermal spray process utilizing heat generated based on combustion of a metal Si powder, at start of spraying, a thermal spray material containing a metal Si powder is ignited by combustion of the metal Si powder caused by pilot light or residual heat of a furnace wall, and then a successively sprayed thermal spray material is continuously combusted by heat generated based on the combustion of the metal Si powder serving as pilot light, whereby the thermal spray material is melt-adhered to a target surface. Thus, if ignitability of a thermal spray material at start of spraying (hereinafter referred to as "initial ignitability") is insufficient, it becomes unable to strongly bond a refractory raw material powder in the thermal spray material to the target surface.

In this regard, the Patent Document 3 describes an example where an iron powder serving as an ignition promoter is added so as to ensure the initial ignitability. However, the addition of an iron powder causes formation of a low-melting-point substance or a different mineral phase and thus a large variation in expansion characteristics, so that bondability after repetitive heating and cooling (hereinafter referred to as "post-repetition bondability") is deteriorated.

Further, in the Patent Document 3, there is a description that, from a viewpoint of ensuring an ignition promoting effect by the ignition promoter, a particle size of a metal powder serving as the ignition promoter is preferably 100 μm or less (paragraph [0037]). However, if the metal powder is simply reduced in particle size, a problem arises that a dust-generating property of the thermal spray material becomes higher.

Therefore, the present invention addresses a technical problem of providing a thermal spray material capable of, when used in a thermal spray operation for repairing a furnace wall of an industrial furnace or for other purposes, maintaining good post-repetition bondability with respect to a target surface to thereby prevent peel-off of a resulting thermally sprayed deposit, and improving initial ignitability while suppressing dust-generating property.

Solution to Technical Problem

As a result of studies, the inventors obtained a finding that an ultrafine metal Si powder having a particle size of 10 μm or less is an important parameter contributing to the initial ignitability. The inventors obtained another finding that, by keeping a good balance between respective added amounts of a metal Si powder having a specific particle size or less and a basic compound such as a magnesia-based powder, having a specific particle size or less, in a thermal spray material, reactivity of the thermal spray material is improved to achieve an improvement in the post-repetition bondability, and the improvement in the reactivity of the thermal spray material allows the ultrafine metal Si powder having a particle size of 10 μm or less to effectively undergo combustion so as to suppress the dust-generating property. The inventors obtained yet another finding that, contrary to common technical knowledge that a reduction in particle size causes worsening of the dust-generating property, when an amount of the metal Si powder having a particle size of 10 μm or less is increased, the metal Si powder is efficiently combusted to reduce an amount of an uncombusted metal Si powder, and thereby the dust-generating property is suppressed.

According to one aspect of the present invention, there is provided a thermal spray material capable of being sprayed onto a target surface using oxygen or oxygen-containing gas as a carrier gas and ret-adhered to the target surface by means of heat generated based on combustion of a metal Si powder. The thermal spray material contains: a basic compound comprising at least one of a Ca component and an Mg component, in an amount of 2 mass % to 25 mass %; a metal Si powder in an amount of 10 mass % to 30 mass %; and one or more refractory powders selected from the group consisting of silica-based powders and alumina-silica based powders, in an amount of 50 mass % to 86 mass %; wherein: a content rate of a fraction constituting the basic compound and having a particle size of 0.15 mm or less is 30 mass % or more with respect to 100 mass % of the basic compound; a content rate of a fraction constituting the metal Si powder and having a particle size of 20 μm or less is from 10 mass % to 25 mass % with respect to 100 mass % of the thermal spray material; (the content rate (mass %) of the fraction constituting the metal Si powder and having a particle size of 20 μm or less, with respect to 100 mass % of the thermal spray material)/(a content rate (mass %) of the fraction constituting the basic compound and having a particle size of 0.15 mm or less, with respect to 100 mass % of the thermal spray material) is from 0.8 to 10; and a content rate of a fraction constituting the metal Si powder and having a particle size of 10 μm or less is 60 mass % or more with respect to 100 mass % of the metal Si powder.

Effect of Invention

In the present invention, the initial ignitability can be improved by using a metal Si powder containing an ultrafine particle fraction having a particle size of 10 μm or less in an amount of 60 mass % or more.

In the present invention, a balance between respective added amounts of a fraction constituting the metal Si powder and having a specific particle size or less and a fraction constituting the basic compound and having a specific particle size or less, in the thermal spray material, is adjusted in an adequate range, and respective content rates of a fraction constituting the metal Si powder and having a specific particle size or less and a fraction constituting the basic compound and having a particle size or less are adjusted in an adequate range, with respect to corresponding ones of the metal Si powder and the basic compound, so that a combustion reaction of the metal Si powder is efficiently induced, and a reaction between $SiO_2$ formed through the combustion reaction of the metal Si powder and MgO or CaO originating from the basic compound is also efficiently progressed. Thus, it becomes possible to prevent the metal Si powder and the basic compound from remaining in a resulting thermally sprayed deposit in a large amount, thereby providing good bondability with respect to the target surface, even after the thermal spray operation and subsequent repetitive heating and cooling. This makes it possible to prevent fall-off of the thermally sprayed deposit. In addition, the efficient progress of the combustion reaction of the metal Si powder makes it possible to suppress a dust-generating property, even using the metal Si powder containing an ultrafine particle fraction having a particle size of 10 μm or less in an amount of 60 mass % or more.

In the present invention, by using the metal Si powder containing an ultrafine particle fraction having a particle size of 10 μm or less in an amount of 60 mass % or more, combustion of the metal Si powder is efficiently induced. This makes it possible to reduce an uncombusted or unreacted part of the metal Si powder and thereby suppress the dust-generating property.

DESCRIPTION OF EMBODIMENTS

A thermal spray material of the present invention contains: a basic compound comprising at least one of a Ca component and an Mg component, in an amount of 2 mass % to 25 mass % (this basic compound will hereinafter be referred to as simply "the specified basic compound"); a metal Si powder in an amount of 10 mass % to 30 mass %; and one or more refractory powders selected from the group consisting of silica-based powders and alumina-silica based powders, in an amount of 50 mass % to 86 mass %.

As the specified basic compound, a magnesia-based powder or a calcia-based powder is typically used. Specific examples of the magnesia-based powder include one or more selected from the group consisting of a magnesia powder, a magnesia-calcia powder, an $MgO$—$Al_2O_3$ based spinel powder, and a magnesia-calcia-silica powder. Specific examples of the calcia-based powder include one or more selected from the group consisting of a calcia powder, a magnesia-calcia powder and a calcia-silica powder. These may be in the form of a sintered powder or may be in the form of a fused powder. Preferably, the magnesia-based powder has an MgO content of 25 mass % or more, and the calcia-based powder has a CaO content of greater than 75 mass %. It is also possible to use, as the specified basic compound, calcium hydrate, magnesium hydrate, calcium carbonate, magnesium carbonate, and magnesium sulfate.

The specified basic compound is prepared such that a content rate thereof is set to be from 2 mass % to 25 mass %. If the content rate is less than 2 mass %, stability of continuous combustion cannot be ensured when a temperature of the target surface is low, so that an obtained thermal spray material becomes inferior in the adherability and the post-repetition bondability. If the content rate is greater than 25 mass %, a content rate of the metal Si powder or the silica-based powder is reduced accordingly so that properties of the metal Si powder or the silica-based powder are impaired. Preferably, the content rate of the specified basic compound is set to be from 4.5 mass % to 20 mass %.

In terms of particle size distribution, the specified basic compound is prepared such that a content rate of a fraction constituting the specified basic compound and having a particle size of 0.15 mm or less is 30 mass % or more, with respect of the entire basic compound. If the content rate of the fraction having a particle size of 0.15 mm or less is less than 30 mass %, an amount of MgO or CaO remaining in a thermally sprayed deposit is increased, so that an obtained thermal spray material becomes inferior in the post-repetition bondability.

As the metal Si powder, it is possible to use a type which is commonly used as a refractory raw material. Specifically, the metal Si powder is prepared such that a fraction constituting the metal Si powder and having a particle size of 20 μm or less is contained in an amount of 10 mass % to 25 mass % with respect to 100 mass % of the thermal spray material. If the content rate of the fraction constituting the metal Si powder and having a particle size of 20 μm or less is less than 10 mass %, an obtained thermal spray material becomes inferior in a combustion-based heat generation (exothermic) property and in the adherability, the post-repetition bondability, and the strength of a thermally sprayed deposit. On the other hand, if the content rate is greater than 25 mass %, an amount of metal Si remaining in a thermally sprayed deposit is increased, so that an obtained thermal spray material becomes inferior in the post-repetition bondability. Moreover, if the content rate of the fraction constituting the metal Si powder and having a particle size of 20 μm or less is greater than 25%, dust generation from the metal Si powder becomes prominent during a thermal spray operation, thereby leading to deterioration in work environment.

The metal Si powder may comprise a fraction having a particle size other than 20 μm or less as in the above fraction. The metal Si powder is prepared such that a content rate thereof is set to be from 10 mass to 30 mass with respect to the entire thermal spray material. If the content rate is less than 10 mass, an obtained thermal spray material becomes inferior in the adherability, the post-repetition bondability, and strength of a thermally sprayed structure, as with the above case. On the other hand, if the content rate of the metal Si powder is greater than 30 mass % with respect to the entire thermal spray material, dust generation from the metal Si powder becomes prominent during a thermal spray operation, thereby leading to deterioration iii work environment, as with the above case.

In terms of particle size distribution, the metal Si powder is prepared such that a content rate of a fraction constituting the metal Si powder and having a particle size of 10 μm or less is 60 mass % or more, with respect to the entire metal Si powder. If the contend rate is less than 60 mass %, it is unable to ensure sufficient initial ignitability. Moreover, if the content rate is less than 60 mass %, an amount of a fraction constituting the metal Si powder and having a particle size of greater than 10 μm is increased, and thus an amount of an uncombusted or unreached part of the metal Si powder is increased, so that the unreached metal Si powder can float in air, causing an increase in dust generation.

Specific examples of the silica-based powder to be used in the present invention include a silica sand powder, a natural quartz powder, a molten silica (silica glass) powder, a silica stone powder, and a refractory powder consisting primarily of the above components. Specific examples of the alumina-silica based powder include agalmatolite, chamotte, clay, flint clay, andalusite, sillimanite, kyanite, and mullite.

In the present invention, one or more refractory powders selected from the group consisting of the above silica-based powders and alumina-silica based powders are contained in an amount of 50 mass % to 86 mass % with respect to 100 mass % of the thermal spray material. If the content rate is less than 50 mass %, an obtained thermal spray material becomes inferior in volume stability of a thermally sprayed deposit, thereby causing deterioration in the post-repetition bondability. On the other hand, if the content rate is greater than 86 mass %, rebound loss during a thermal spray operation is increased, thereby causing deterioration in the adherability.

From a viewpoint of meltability, the particle size of each of the silica-based powders and the alumina-silica, based powders is preferably 2 mm or less. As long as the particle size falls within 2 mm, there is not much difference in terms of the meltability, even when the particle size is limited to 1.5 mm or less or 1 mm or less. More preferably, in a particle size distribution of each of the silica-based powders and the alumina-silica based powders, a content rate of a fraction having a particle size of 0.3 mm or less is adjusted to be from 0 mass % to 15 mass %.

In the thermal spray material of the present invention, "(the content rate (mass %) of the fraction constituting the metal Si powder and having a particle size of 20 μm or less, with respect to 100 mass % of the thermal spray material)/(a content rate (mass %) of the fraction constituting the specified basic compound and having a particle size of 0.15 mm or less, with respect to 100 mass % of the thermal spray material)" (this ratio will hereinafter be referred to as "fine powder ratio") is adjusted to be from 0.8 to 10. If the fine powder ratio is less than 0.8, the content rate of the fraction constituting the specified basic compound and having a particle size of 0.15 mm or less is excessively increased with respect to the content rate of the fraction constituting the metal Si powder and having a particle size of 20 μm or less, so that an amount of MgO or CaO remaining in a thermally sprayed deposit is increased, so that an obtained thermal spray material becomes inferior in the post-repetition bondability. On the other hand, if the fine powder ratio is greater than 10, the content rate of the fraction constituting the specified basic compound and having a particle size of 0.15 mm or less is excessively reduced with respect to the content rate of the fraction constituting the metal Si powder and having a particle size of 20 μm or less, so that, even when the metal Si powder is combusted and formed as $SiO_2$, the reaction between the $SiO_2$ and MgO or CaO in the fine particle fraction of the specified basic compound is not efficiently performed, because an amount of the fine particle fraction of the specified basic compound is excessively small. Thus, an amount of heat generated during a thermal spray operation becomes insufficient, so that an amount of metal Si remaining in a thermally sprayed deposit is increased, thereby causing deterioration in the post-repetition bondability. Moreover, if the fine powder ratio is greater than 10, an amount of the metal Si powder is excessively large, thereby causing worsening of the dust-generating property. Preferably, the fine powder ratio is set to be from 1 to 3.6.

In the thermal spray material of the present invention, a refractory raw material powder other than those described above and other raw material may be used in combination, without impairing an advantageous effect of the present invention. Examples of the other raw material include cements, steelmaking slag and blast furnace slag. For example, these raw materials may be combined within 10 mass %.

EXAMPLES

Table 1 presents Inventive Examples, and Table 2 presents Comparative Examples. Table 1 and Table 2 additionally present evaluation results of the Examples. In Tables 1 and 2, a silica stone powder, chamotte, a magnesia powder, a calcia powder, and a magnesia-calcia powder are used, respectively, as the silica-based powder, the alumina-silica based powder, the magnesia-based powder, the calcia-based powder, and the magnesia-calcia based powder.

TABLE 1

|  |  | Inventive Example 1 | Inventive Example 2 | Inventive Example 3 | Inventive Example 4 | Inventive Example 5 | Inventive Example 6 | Inventive Example 7 | Inventive Example 8 | Inventive Example 9 |
|---|---|---|---|---|---|---|---|---|---|---|
| Thermal Spray Material | Silica-based powder 2 mm or less | 65 | 50 | 86 | 75.5 | 65 | 55 | 60 | 57 | 70 |
|  | Alumina-silica based powder 2 mm or less |  |  |  |  |  |  |  |  |  |
| Basic Compound | Magnesia-based powder 0.5 mm-0.15 mm | 5 | 5 |  |  | 5 | 5 | 5 | 3 | 7 |
|  | Magnesia-based powder 0.15 mm-0 mm | 10 | 17 | 2 | 4.5 | 15 | 20 | 10 | 10 | 3 |
|  | Calcia-based powder 0.5 mm-0.15 mm |  |  |  |  |  |  |  |  |  |
|  | Calcia-based powder 0.15 mm-0 mm |  |  |  |  |  |  |  |  |  |
|  | Magnesia-calcia based powder 0.5 mm-0.15 mm |  |  |  |  |  |  |  |  |  |
|  | Magnesia-calcia based powder 0.15 mm-0 mm |  |  |  |  |  |  |  |  |  |
| Metal Si powder | Metal Si powder(45-20 μm) |  | 8 | 2 | 4 |  |  |  | 8 |  |
|  | Metal Sii powder(20 μm or less) | 20 | 20 | 10 | 16 | 15 | 20 | 25 | 22 | 20 |
|  | 10 μm or less; 85 mass % |  |  |  |  |  |  |  |  |  |
|  | Ignition promoter iron powder |  |  |  |  |  |  |  |  |  |
|  | Content rate of a basic compoung fraction having particle size of 0.15 mm or less, with respect to 100 mass % of the basic compound | 67 | 77 | 100 | 100 | 75 | 80 | 67 | 77 | 30 |

TABLE 1-continued

|  |  |  |  |  |  |  |  |  |  |
|---|---|---|---|---|---|---|---|---|---|
|  | Fine powder ratio (metal Si powder fraction having particle suze of 20 μm or less/basic compound having a oarticle size of 0.15 mm or less) | 2.0 | 1.2 | 5.0 | 3.6 | 1.0 | 1.0 | 2.5 | 2.2 | 6.7 |
|  | Content rate of metal Si power fraction having a particle size of 10 μm or less, with respect to 100 mass % of the metal Si powder | 85 | 60.7 | 70.8 | 68 | 85 | 85 | 85 | 62.3 | 85 |
| Evaluation | Post-repetition bondability | ◎ | ○ | ○ | ◎ | ◎ | Δ | ○ | Δ | ○ |
|  | Si remaining in thermally sprayed deposit (mass %) | 4 | 9 | 10 | 8 | 7 | 8 | 10 | 10 | 8 |
|  | Initial ignitability | ◎ | ◎ | ◎ | ◎ | ◎ | ◎ | ◎ | ◎ | ◎ |
|  | Dust-generation performance | ◎ | Δ | ○ | ◎ | ◎ | ◎ | ◎ | ○ | ◎ |
|  | Complehensive evaluation | ◎ | Δ | ○ | ◎ | ◎ | Δ | ○ | Δ | ○ |

|  |  |  | Inventive Example 10 | Inventive Example 11 | Inventive Example 12 | Inventive Example 13 | Inventive Example 14 | Inventive Example 15 | Inventive Example 16 |
|---|---|---|---|---|---|---|---|---|---|
| Thermal Spray Material | Silica-based powder 2 mm or less |  | 70 | 68 | 72.5 | 63.6 | 65 | 65 |  |
|  | Alumina-silica based powder 2 mm or less |  |  |  |  |  |  |  | 65 |
|  | Basic Compound | Magnesia-based powder 0.5 mm-0.15 mm | 6 | 4 |  | 5 |  |  | 5 |
|  |  | Magnesia-based powder 0.15 mm-0 mm | 4 | 16 | 2.5 | 10 |  |  | 10 |
|  |  | Calcia-based powder 0.5 mm-0.15 mm |  |  |  |  | 5 |  |  |
|  |  | Calcia-based powder 0.15 mm-0 mm |  |  |  |  | 10 |  |  |
|  |  | Magnesia-calcia based powder 0.5 mm-0.15 mm |  |  |  |  |  | 5 |  |
|  |  | Magnesia-calcia based powder 0.15 mm-0 mm |  |  |  |  |  | 10 |  |
|  | Metal Si powder | Metal Si powder (45-20 μm) |  |  |  | 6.3 |  |  |  |
|  |  | Metal Sii powder (20 μm or less) 10 μm or less; 85 mass % | 20 | 12 | 25 | 15.1 | 20 | 20 | 20 |
|  | Ignition promoter iron powder |  |  |  |  |  |  |  |  |
|  | Content rate of a basic compoung fraction having particle size of 0.15 mm or less, with respect to 100 mass % of the basic compound |  | 40 | 80 | 100 | 67 | 67 | 67 | 67 |
|  | Fine powder ratio (metal Si powder fraction having particle suze of 20 μm or less/basic compound having a oarticle size of 0.15 mm or less) |  | 5.0 | 0.8 | 10.0 | 1.5 | 2.0 | 2.0 | 2.0 |
|  | Content rate of metal Si power fraction having a particle size of 10 μm or less, with respect to 100 mass % of the metal Si powder |  | 85 | 85 | 85 | 60 | 85 | 85 | 85 |
| Evaluation | Post-repetition bondability |  | ◎ | Δ | Δ | Δ | ◎ | ◎ | ◎ |
|  | Si remaining in thermally sprayed deposit (mass %) |  | 6 | 8 | 10 | 10 | 3 | 4 | 4 |
|  | Initial ignitability |  | ◎ | ◎ | ◎ | ○ | ◎ | ◎ | ◎ |
|  | Dust-generation performance |  | ◎ | ○ | Δ | Δ | ◎ | ◎ | ◎ |
|  | Complehensive evaluation |  | ◎ | Δ | Δ | Δ | ◎ | ◎ | ◎ |

TABLE 2

|  |  |  | Copparative Example 1 | Copparative Example 2 | Copparative Example 3 | Copparative Example 4 | Copparative Example 5 | Copparative Example 6 |
|---|---|---|---|---|---|---|---|---|
| Thermal Spray Material | Silica-based powder 2 mm or less |  | 55 | 78.5 | 50 | 58 | 90 | 60 |
|  | Alumina-silica based powder 2 mm or less |  |  |  |  |  |  |  |
|  | Basic Compound | Magnesia-based powder 0.5 mm-0.15 mm |  |  |  |  |  | 25 |
|  |  | Magnesia-based powder 0.15 mm-0 mm | 30 | 1.5 | 15 | 15 | 5 | 5 |
|  |  | Calcia-based powder 0.5 mm-0.15 mm |  |  |  |  |  |  |
|  |  | Calcia-based powder 0.15 mm-0 mm |  |  |  |  |  |  |
|  |  | Magnesia-calcia based powder 0.5 mm-0.15 mm |  |  |  |  |  |  |
|  |  | Magnesia-calcia based powder 0.15 mm-0 mm |  |  |  |  |  |  |

TABLE 2-continued

|  |  |  |  |  |  |  |  |  |
|---|---|---|---|---|---|---|---|---|
|  | Metal Si powder | Metal Si powder(45-20 μm) |  |  | 5 | 10 |  |  |
|  |  | Metal Sii powder(20 μm or less) 10 μm or less; 85 mass % | 15 | 15 | 25 | 27 | 5 | 10 |
|  |  | Ignition promoter iron powder |  |  |  |  |  |  |
|  | Content rate of a basic compoung fraction having a particle size of 0.15 mm or less, with respect to 100 mass % of the basic compound |  | 100 | 100 | 100 | 100 | 100 | 17 |
|  | Fine powder ratio (metal Si powder fraction having particle suze of 20 μm or less/basic compound having a oarticle size of 0.15 mm or less) |  | 0.5 | 10.0 | 1.7 | 1.8 | 1.0 | 2.0 |
|  | Content rate of metal Si power fraction having a particle size of 10 μm or less, with respect to 100 mass % of the metal Si powder |  | #REF! | #REF! | #REF! | #REF! | #REF! | #REF! |
| Evaluation | Post-repetition bondability |  | X | X | X | X | X | X |
|  | Si remaining in thermally sprayed deposit (mass %) |  | 13 | 14 | 15 | 12 | 18 | 15 |
|  | Initial ignitability |  | ⊚ | ○ | ○ | ⊚ | ○ | ○ |
|  | Dust-generation performance |  | ○ | Δ | X | X | X | Δ |
|  | Comprehensive evaluation |  | X | X | X | X | X | X |

|  |  |  | Copparative Example 7 | Copparative Example 8 | Copparative Example 9 | Copparative Example 10 | Copparative Example 11 |
|---|---|---|---|---|---|---|---|
|  | Thermal Spray Material | Silica-based powder 2 mm or less | 60 | 55 | 62 | 85 | 65 |
|  |  | Alumina-silica based powder 2 mm or less |  |  |  |  |  |
|  | Basic Compound | Magnesia-based powder 0.5 mm-0.15 mm | 5 | 18 | 10 |  | 5 |
|  |  | Magnesia-based powder 0.15 mm-0 mm | 25 | 2 | 10 | 15 | 10 |
|  |  | Calcia-based powder 0.5 mm-0.15 mm |  |  |  |  |  |
|  |  | Calcia-based powder 0.15 mm-0 mm |  |  |  |  |  |
|  |  | Magnesia-calcia based powder 0.5 mm-0.15 mm |  |  |  |  |  |
|  |  | Magnesia-calcia based powder 0.15 mm-0 mm |  |  |  |  |  |
|  | Metal Si powder | Metal Si powder(45-20 μm) |  |  | 8 |  |  |
|  |  | Metal Sii powder(20 μm or less) 10 μm or less; 85 mass % | 10 | 25 | 10 |  | 20 |
|  |  |  |  |  |  | 15 |  |
|  | Ignition promoter iron powder |  |  |  |  |  | 0.5 |
|  | Content rate of a basic compoung fraction having a particle size of 0.15 mm or less, with respect to 100 mass % of the basic compound |  | 83 | 10 | 50 | 100 | 67 |
|  | Fine powder ratio (metal Si powder fraction having particle suze of 20 μm or less/basic compound having a oarticle size of 0.15 mm or less) |  | 0.4 | 12.5 | 1.0 | 1.0 | 2.0 |
|  | Content rate of metal Si power fraction having a particle size of 10 μm or less, with respect to 100 mass % of the metal Si powder |  | #REF! | #REF! | #REF! | 23.1 | 85 |
| Evaluation | Post-repetition bondability |  | X | X | ○ | ○ | X |
|  | Si remaining in thermally sprayed deposit (mass %) |  | 10 | 14 | 10 | 8 | 9 |
|  | Initial ignitability |  | ○ | ○ | X | X | ⊚ |
|  | Dust-generation performance |  | ○ | X | X | X | X |
|  | Comprehensive evaluation |  | X | X | X | X | X |

In a thermal spray apparatus used in an operation of thermally spraying each thermal spray material in the Examples, a nitrogen gas as an inert gas was introduced in a material tank to cope with a risk of combustion of the thermal spray material in the material tank due to backfire from a nozzle tip or the like. The thermal spray material was fed through a table feeder installed at a bottom of the tank, and conveyed by oxygen. In this process, although the inert gas from an inside of the material tank is mixed into the oxygen, it does not hinder ignition and combustion of the thermal spray material because an amount of the mixed inert gas is insignificant.

In each Example, 3 kg of the thermal spray material was sprayed onto a target surface under a condition that a powder supply speed was 50 kg/h; and a distance between the target surface and the nozzle tip was from 50 to 70 mm.

As the post-repetition bondability, bondability between a thermally sprayed deposit and a brick (target surface) was measured after subjecting the thermally sprayed deposit to a repetitive cycle of temperature rising-lowering cycles between 300° C. and 1000° C., 100 times. In this evaluation, a thermal spray material having better post-repetition bondability was evaluated as a higher one of the following four ranks: ⊚ (Excellent), ○ (Good), Δ (Acceptable) and x (NG). Specifically, when a thermally sprayed deposit was breakingly detached together with the brick as a result of an operation of detaching the deposit by hammering, the thermal spray material was evaluated as ⊚ (Excellent); when no defect in bonding was observed from external appearance, and the thermally sprayed deposit was peeled off from a bonding interface as a result of the operation of detaching the deposit by hammering, the thermal spray material was evaluated as ○ (Good); when a partially detached portion was observed from the external appearance, the thermal spray material was evaluated as Δ (Acceptable); and when a defect in bonding was significantly observed from the external appearance, the thermal spray material was evaluated as x (NG).

Further, an amount of metal Si remaining in a thermally sprayed deposit bonded to a target surface was evaluated by quantitative analysis.

As to the initial ignitability when ignition was visually confirmed within 5 seconds after start of thermal spray with respect to a target surface, the thermal spray material was evaluated as ⊚ (Excellent); when ignition was visually confirmed in the range of 5 seconds to 10 seconds, the thermal spray material was evaluated as ○ (Good); when ignition was visually confirmed in the range of 10 seconds to 15 seconds, the thermal spray material was evaluated as Δ (Acceptable); and when ignition was visually confirmed at a time of greater than 15 seconds, or no ignition was confirmed, the thermal spray material was evaluated as x (NG).

As to evaluation on the dust-generation property, when almost no dust generation occurred, and visibility was good, the thermal spray material was evaluated as ⊚ (Excellent); when dust generation slightly occurred, but visibility was good, the thermal spray material was evaluated as ○ (Good); when dust generation occurred to cause slight deterioration in visibility, but it did not cause difficulty in continuing the thermal spray operation, the thermal spray material was evaluated as Δ (Acceptable); and when dust generation occurred to cause deterioration in visibility and thus difficulty in continuing the thermal spray operation, the thermal spray material was evaluated as x (NG).

Then, as to comprehensive evaluation, when all of the evaluations on the post-repetition bondability, the initial ignitability and the dust generating property were ⊚ (Excellent), and the amount of Si remaining in the thermally sprayed deposit was 10 mass % or less, the thermal spray material was evaluated as ⊚ (Excellent); when the worst evaluation among all of the evaluations was ○ (Good), and the amount of Si remaining in the thermally sprayed deposit was 10 mass % or less, the thermal spray material was evaluated as ○ (Good); when the worst evaluation among all of the evaluations was Δ (Acceptable), and the amount of Si remaining in the thermally sprayed deposit was 10 mass % or less, the thermal spray material was evaluated as Δ (Acceptable); and when the worst evaluation among all of the evaluations was x (NG), or the amount of Si remaining in the thermally sprayed deposit was 10 mass % or more, the thermal spray material was evaluated as x (NG).

Each of Inventive Examples 1 to 16 falling within the scope of the present invention was evaluated as Δ or better in the comprehensive evaluation.

In Comparative Example 1 as an example where the content of the magnesia-based powder is excessive, an unreacted part of the magnesia-based power largely remained in a thermally sprayed deposit, and the post-repetition bondability was evaluated as x (NG). The unreacted magnesia-based powder absorbs heat from the metal Si powder without generating heat. Thus, a reactivity of the metal Si powder was deteriorated, and the amount of Si remaining in the thermally sprayed deposit was increased to 10 mass % or more.

In Comparative Example 2 as an example where the content of the magnesia-based powder is insufficient, a reaction between $SiO_2$ and the magnesia-based powder was insufficient, and the post-repetition bondability was evaluated as x (NG). Moreover, due to the insufficiency of the magnesia-based powder, the amount of Si remaining in the thermally sprayed deposit was increased to 10 mass % or more.

Comparative Example 3 is an example where the content of the metal Si powder in the thermal spray material is excessive, and Comparative Example 4 is an example where the content of the fraction constituting the metal Si powder and having a particle size of 20 μm or less is excessive. In both of Comparative Examples 3 and 4, the post-repetition bondability was evaluated as x (NG), and the amount of Si remaining in the thermally sprayed deposit was increased to 10 mass % or more. Moreover, the dust generating property was also evaluated as x (NG).

In Comparative Example 5 as an example where the content of the metal Si powder is insufficient, the post-repetition bondability was evaluated as x (NG). Moreover, due to inferiority in the post-repetition bondability, an amount of a thermally sprayed deposit adhered to the target surface becomes excessively small, so that the amount of Si remaining in the small amount of thermally sprayed deposit was increased to 10 mass % or more.

In Comparative Example 6 as an example where the content of the fraction constituting the magnesia-based powder and having a particle size of 0.15 mm or less is insufficient, an unreacted part of the magnesia-based power largely remained in a thermally sprayed deposit, and the post-repetition bondability was evaluated as x (NG). Moreover, as with Comparative Example 1, the unreacted magnesia-based powder absorbs heat, so that the amount of Si remaining in the thermally sprayed deposit was increased to 10 mass % or more.

In Comparative Example 7 as an example where the fine powder ratio is less than. 0.8, the post-repetition bondability was evaluated as x (NG). In Comparative Example 8 as an example where the fine powder ratio is greater than 10, the post-repetition bondability was evaluated as x (NG), and the amount of Si remaining in the thermally sprayed deposit was increased to 10 mass % or more.

In Comparative Example 9 as an example where the content rate of the fraction constituting the metal Si powder and having a particle size of 10 μm or less, with respect to 100 mass % of the metal Si powder, is insufficient, the initial ignitability was evaluated as x (NG). Moreover, an amount of a fraction constituting the metal Si powder and having a particle size of greater than 10 μm is increased, and thus an amount of an unreacted part of the metal Si powder is increased, so that the unreached metal Si powder floated in air, causing an increase in dust generation. As a result, the dust generating property was evaluated as x (NG).

Comparative Example 10 is also an example where the content rate of the fraction constituting the metal Si powder and having a particle size of 10 μm or less, with respect to 100 mass % of the metal Si powder, is insufficient. A difference from Comparative Example 9 is as follows: In Comparative Example, a fraction constituting the metal Si powder and having a particle size of greater than 20 μm to 45 μm is contained in an amount of 8 mass %, and thereby the content rate of the fraction constituting the metal Si powder and having a particle size of 10 μm or less becomes less than 60 mass %, whereas, in Comparative Example 10, although the entire metal Si powder has a particle size of 20 μm or less, the metal Si powder having a particle size of 20 μm or less comprises a fraction having a particle size of 10 μm or less, in an amount of only 30 mass %, and thereby the content rate of the fraction constituting the metal Si powder and having a particle size of 10 μm or less becomes less than 60 mass %. In Comparative Example 10, the initial ignitability was evaluated as x (NG), and the unreached metal Si powder floated in air, causing an increase in dust generation. As a result, the dust generating property was evaluated as x (NG), as with Comparative Example 9.

In Comparative Example 11 as an example where an iron powder was added as an ignition promoter, according to the aforementioned Patent Document 3, a low-melting-point substance was formed by the iron powder, and an expansion characteristic was largely changed due to the low-melting-point substance, so that the post-repetition bondability was evaluated as x (NG). Moreover, due to an oxidation reaction of the iron powder, reddish brown dust was generated, so that the dust generating property was also evaluated as x (NG).

The invention claimed is:

1. A thermal spray material capable of being sprayed onto a target surface using oxygen or oxygen-containing gas as a carrier gas and melt-adhered to the target surface by means of heat generated based on combustion of a metal Si powder, the thermal spray material containing:

a basic compound comprising at least one of a Ca component and an Mg component, in an amount of 4.5 mass % to 20 mass %;

a metal Si powder in an amount of 15 mass % to 30 mass %; and one or more refractory powders selected from the group consisting of silica-based powders and alumina-silica based powders, in an amount of 50 mass % to 86 mass %;

wherein:

a content rate of a fraction constituting the basic compound and having a particle size of 0.15 mm or less is 30 mass % or more with respect to 100 mass % of the basic compound;

a content rate of a fraction constituting the metal Si powder and having a particle size of 20 μm or less is from 15 mass % to 25 mass % with respect to 100 mass % of the thermal spray material;

(the content rate (mass %) of the fraction constituting the metal Si powder and having a particle size of 20 μm or less, with respect to 100 mass % of the thermal spray material)/(a content rate (mass %) of the fraction constituting the basic compound and having a particle size of 0.15 mm or less, with respect to 100 mass % of the thermal spray material) is from 0.8 to 10; and a content rate of a fraction constituting the metal Si powder and having a particle size of 10 μm or less is 60 mass % or more with respect to 100 mass % of the metal Si powder, and wherein the content rate of the fraction constituting the basic compound and having a particle size of 0.15 mm or less is from 4 mass % to 16 mass % with respect to 100 mass % of the thermal spray material.

2. The thermal spray material as recited in claim 1, wherein (the content rate (mass %) of the fraction constituting the metal Si powder and having a particle size of 20 μm or less, with respect to 100 mass % of the thermal spray material)/(the content rate (mass %) of the fraction constituting the basic compound and having a particle size of 0.15 mm or less, with respect to 100 mass % of the thermal spray material) is from 1 to 3.6.

* * * * *